United States Patent [19]

Brewster

[11] 3,832,908

[45] Sept. 3, 1974

[54] ONE PIECE PLASTIC TUNING SHAFT FOR A RADIO RECEIVER OR THE LIKE DEVICE

[75] Inventor: Franklin C. Brewster, Franklin Park, Ill.

[73] Assignee: Motorola, Inc., Franklin Park, Ill.

[22] Filed: Mar. 2, 1973

[21] Appl. No.: 337,624

[52] U.S. Cl. ............. 74/10.33, 64/17 SP, 64/11 R, 64/30 R, 74/10.8, 188/83
[51] Int. Cl. ........................................... F16h 35/18
[58] Field of Search ........ 64/17 SP, 17 R, 1 R, 1 V, 64/30 C, 30 R, 11 R, 27 NM, 30 D; 74/10.8, 10.33, 10 R; 188/67, 83

[56] References Cited
UNITED STATES PATENTS

| 1,574,715 | 2/1926 | Warner | 188/83 |
| 1,588,039 | 6/1926 | Monosmith | 188/83 |
| 3,332,255 | 7/1967 | Seagraucs et al. | 64/11 |
| 3,393,535 | 7/1968 | Morin | 64/11 R |
| 3,405,539 | 10/1968 | Tanaka | 64/11 R |
| 3,487,658 | 1/1970 | Johnson | 64/30 R |
| 3,503,270 | 3/1970 | Ohashi | 74/10.33 |
| 3,626,721 | 12/1971 | Koen | 64/30 R |

FOREIGN PATENTS OR APPLICATIONS

| 2,056,862 | 11/1969 | Germany | 74/10.33 |

Primary Examiner—Benjamin W. Wyche
Assistant Examiner—Randall Heald
Attorney, Agent, or Firm—Donald J. Lisa; Vincent J. Rauner

[57] ABSTRACT

A one piece integrally formed manual tuning shaft for a radio receiver includes a first rotatable driving shaft portion and a second rotatably driven shaft portion. An integrally formed universal joint section is provided in the second driven shaft portion; the universal joint section including first and second opposing shaft pieces and a plate portion joined therebetween. Each of the shaft pieces is joined to the plate portion by an integrally formed hinge; the hinges being at right angles with respect to each other to permit angular movement of the shaft pieces with respect to each other. In one embodiment, a flange formed between the first and second shaft portions is enlarged and resiliently bendable to conform to the curved wall of a mounting bushing received on the first driving shaft portion to provide rotational resistance to minimize vibration of the tuning shaft assembly in a radio receiver. In another embodiment of the tuning shaft assembly, the driving shaft portion includes a compressible enlarged area for providing a friction fit between the shaft portion and a standard mounting bushing received thereon to minimize the effect of vibrations and shock.

7 Claims, 8 Drawing Figures

PATENTED SEP 3 1974 3,832,908
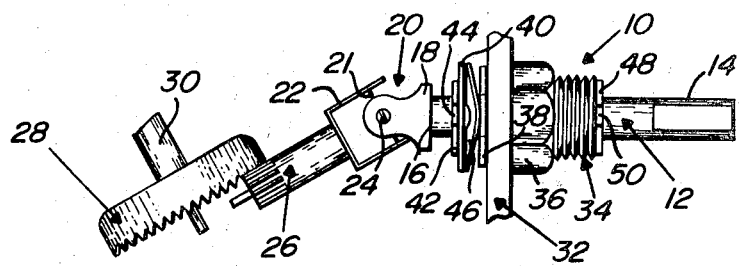
PRIOR ART Fig.1
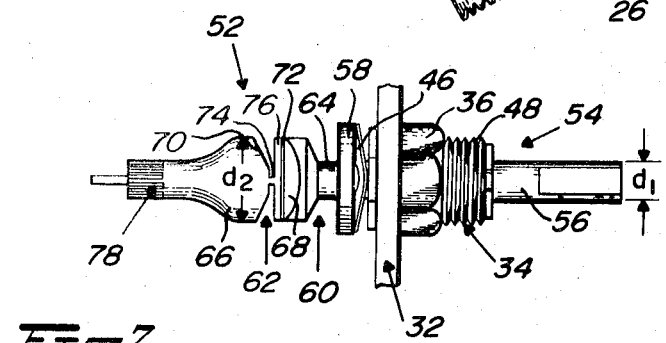
Fig.2
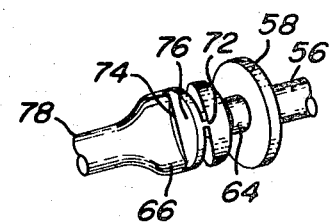
Fig.3
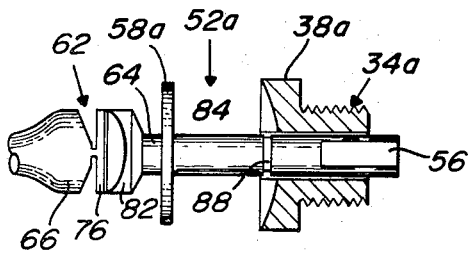
Fig.4a
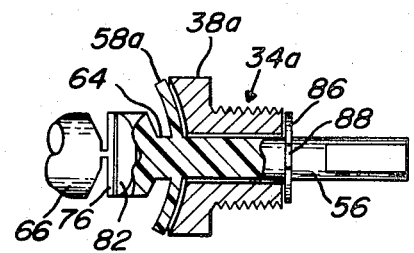
Fig.4b
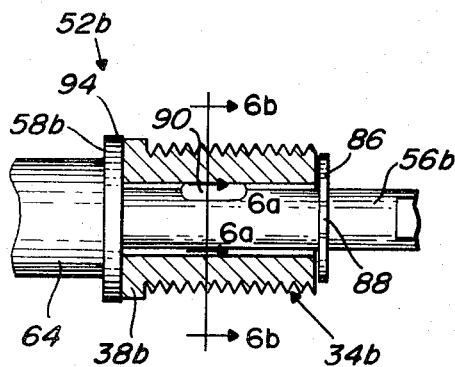
Fig.5
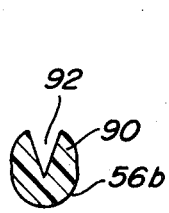
Fig.6a
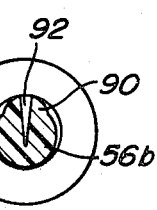
Fig.6b

ONE PIECE PLASTIC TUNING SHAFT FOR A RADIO RECEIVER OR THE LIKE DEVICE

BACKGROUND

This invention relates generally to automobile or the like radio receivers and more particularly to the manual tuning control mechanism for such radio receivers.

Conventionally, the manual tuning control shaft assembly in an automobile or the like radio receiver includes a metal shaft to which there is fastened, at one end, a universal joint arrangement comprising a pair of U-shaped metallic members which are connected together by a cross-shaped member with the legs of the U in opposing relation, but at 180° from each other. The universal joint arrangement is in turn coupled to a pinion portion used to drive a gear member in the radio receiver. In all, five dissimilar parts are required to provide such a universal joint arrangement. The last-mentioned arrangement is necessary in a vehicular pushbutton type radio wherein the gear being driven by the manual tuning shaft is positioned out of alignment therewith and/or to permit the declutching of the manual tuning shaft by a sidewise movement thereof upon depression of a pushbutton in the radio receiver when tuning to a preselected frequency.

Because the universal joint arrangement conventionally used is costly to fabricate, many alternatives, such as, for example, a continual, flexible plastic or the like shaft, have been substituted therefor. With these substitute devices, however, other problems such as backlash, etc., arise to make the device unacceptable.

In addition to the aforementioned, in a conventional automotive pushbutton radio tuner, there is a need to provide a fixed rotational resistance in the manual tuning shaft. One reason for this fixed resistance is that the mechanism for moving the tuning cores which time the coils of the radio receiver must be relatively free-floating to maintain the force required to operate the pushbuttons at an acceptable level. Conventionally, anti-backlash springs are provided in the tuning drive and dial pointer systems which bias the free-floating portion of the tuning mechanism and tend to move the tuner to a higher or lower frequency setting, depending upon the spring bias force direction. With the latter unchecked, the tuning mechanism could cause a change in frequency which has been selected, when shock or vibration are imparted to the radio receiver. To lock the free-floating mechanism into place, once a radio frequency setting has been obtained, it is conventional to apply a predetermined force to the manual tuning shaft side of the tuner declutch mechanism which force is applied or removed in accordance with the release and depression respectively, of the pushbuttons of the radio receiver. The force which is applied to the manual tuner shaft is magnified through a conventional crown gear arrangement to provide sufficient locking force to prevent detuning due to shock and vibration.

A second reason to pre-load the manual tuning shaft is to mask or cover up the "feel" of the teeth of the pinion gear of the tuner shaft meshing with the teeth of the crown gear which drives the tuning cores.

Conventionally, to provide this loading of the manual tuning shaft, a spring washer is received thereon and sandwiched in a tensioned position between a threaded bushing also received on the shaft for fastening the tuner shaft to the front plate or bezel of the radio receiver, and other washers on the shaft. This arrangement, while functioning adequately to mount the manual tuning shaft, again requires the assembly of several parts including C-washers, flat washers and the special spring washer. The latter increases the fabrication cost considerably as well as adds to the production time of the radio receiver itself.

SUMMARY

Accordingly, it is an object of the present invention to provide a new and improved integrally formed mechanical assembly in the manual tuning shaft of a radio receiver which provides the function of a universal joint arrangement but which is relatively inexpensive to fabricate.

It is another object of the present invention to provide a rotatable manual tuning shaft assembly for use in a radio receiver or the like device, which includes a one piece universal joint coupling.

It is yet another object of the present invention to provide a manual tuning shaft assembly of the above described type which includes an integral rotational pre-load force to prevent shaft rotation when the radio is subject to vibration or shock forces.

It is still another object of the present invention to provide a new and improved manual tuning shaft assembly for a radio receiver or the like device, which is relatively inexpensive to fabricate, has fewer parts than conventionally used tuning shaft assemblies, which is easy to mount in a radio receiver device and which functions equally as well as a conventionally used tuning shaft assembled from a multiplicity of metal parts.

Briefly, a preferred embodiment of the manual tuning shaft assembly according to the invention includes a one piece plastic shaft having a first shaft portion adapted for receipt of a tuner knob, and joined to said first shaft portion, an integrally formed flange with which a threaded bushing received on the first shaft portion comes into engagement when mounting the shaft on a bezel or the like plate member. Joined integrally with the flange and first tuning shaft portion is a one piece universal joint arrangement formed directly from a second integral shaft portion. The second shaft portion is fabricated to include two opposing shaft pieces between which there is provided a plate attached to one shaft piece by an integral hinge formed along a first diameter and to the second shaft piece by a second integral hinge formed along a diameter extending 90° to the first-mentioned diameter. The opposing ends of the shaft pieces are cut at an angle, away from and on opposite sides of the lines of connection with the center plate to permit movement similar to that of a conventional universal joint arrangement. A pinion shaft is formed integrally and coaxially with one of the shaft pieces and extends outwardly therefrom to drive a gear or the like mechanism.

In a second embodiment, a flange portion between the first and second shaft portions provides tension against a specially contoured end surface of a threaded bushing member received on the first shaft portion to preload the manual tuning shaft. The latter eliminates the need for a spring washer when mounting the shaft portion by means of the bushing member in an aperture in the bezel of a radio receiver. Alternatively, the first-mentioned shaft portion can be molded to include a raised or enlarged portion which frictionally engages the inner bore of the bushing member received on the shaft portion, likewise for the prevention of rotational motion of the shaft with respect to the bezel on which the assembly is mounted.

DESCRIPTION OF THE DRAWING

In the drawing:

FIG. 1 is a side view of a conventional, prior art manual tuning shaft assembly for a radio receiver;

FIG. 2 is a side view of one embodiment of a manual tuning shaft assembly according to the invention;

FIG. 3 is a fragmentary, perspective view of the integrally formed universal joint section of the manual tuning shaft assembly of FIG. 2;

FIGS. 4a and 4b are side, sectional views of a manual tuning shaft assembly according to the invention having a modified driving shaft portion for receipt of a modified mounting bushing member;

FIG. 5 is an enlarged, side sectional view of a manual tuning shaft assembly according to the invention having a driving shaft portion modified in an alternative manner; and FIGS. 6a and 6b are end, sectional views of the manual tuning shaft assembly of FIG. 5 taken along the lines 6a—6a and 6b—6b, respectively.

DETAILED DESCRIPTION

Referring now to the drawing in greater detail, there is illustrated in FIG. 1 a conventional, prior art manual tuning shaft assembly 10 including a first driving shaft portion 12 formed of a metal rod.

A free end 14 of the shaft portion 12 is shaped to receive a tuning knob or the like member (not shown). The opposite end 16 of the driving shaft portion is fastened by a rivet or the like fastener (not shown) to a first metallic U-shaped bracket 18 of a universal joint arrangement 20. The universal joint arrangement includes a second U-shaped metal bracket 22 having the legs of the U extending in opposing relation with respect to the legs of the first-mentioned bracket. The brackets are coupled together by a cross-shaped metallic member 21, the ends of the legs of which are received in apertures, such as 24 in the legs of the U-shaped members. A metallic driven pinion gear shaft 26 is riveted to the U-shaped member 22 for driving a crown or the like gear 28 mounted for rotation on a shaft 30 in a radio receiver or the like device.

As can be seen from the drawing, the universal joint arrangement 20 permits the pinion shaft to be moved at some angle with respect to the driving shaft portion 12 during rotation of the tuner shaft assembly.

To mount the prior art tuning shaft assembly to a front plate or bezel such as 32 of a radio receiver or the like device, a threaded bushing 34 which is received on driving shaft portion 12 is inserted through an aperture in the bezel and a nut 36 is received on the bushing to press the rear flanged portion 38 of the bushing against one surface of the bezel while the nut 36 is tightened down on the front surface of the bezel to sandwich the latter between the nut and the bushing flange. To mount the bushing on the shaft portion 12, a flat washer 40 is first received thereon which is held in place at a preselected location by a C-washer 42 received in a groove 44 formed circumferentially about the shaft. Thereafter, to prevent undesirable rotation of the tuner shaft assembly when mounted and subjected to vibration or shock such as, for example, in an automobile or the like vehicle, a spring washer 46 is provided between the flat washer 40 and flange 38 of the bushing. The bushing is forced against the spring washer and the latter is held tensioned by a second C-washer 48 provided in a second circumferential groove 50 formed in the shaft portion 12.

As can be seen, many parts which must be assembled, are required to produce the conventional prior art manual tuning shaft assembly for use in an automobile or the like radio receiver or similar device.

Referring now to FIG. 2 of the drawing, there is shown therein a manual tuning shaft assembly 52 according to the invention. The tuning shaft assembly 52 includes an integrally formed plastic shaft assembly having a driving shaft portion 56, having a circular cross-section and herein shown as being of a first diameter d1, joined integrally with an enlarged circular flange portion 58, serving as a stop for the threaded bushing 34 and spring washer 46, described heretofore for mounting the shaft assembly to a front plate or bezel of a radio receiver. Formed integrally with the flange, on the opposite side thereof, is a driven shaft portion 60 also having a circular cross-section and including an integrally formed universal joint section 62 including a first shaft piece 64 joined with flange 58 and a second shaft piece 66. Opposing ends 68, 70 of the shaft pieces, respectively, are attached by integral hinged portions 72, 74 to a circular plate 76 formed therebetween. The latter can be seen best in FIG. 3 of the drawing. The lines of attachment of shaft pieces 64, 66 to opposite surfaces of plate portion 76, are at substantially right angles with respect to each other and the opposing ends 68, 70 of the shaft pieces are cut back at some angle, selected in accordance with the desired angular degree of movement between the shaft pieces, to permit movement of the last-mentioned shaft pieces angularly with respect to each other during rotation of the shaft assembly.

As will be noted, the diameter of the driven shaft portion d2 in the area of the integral hinged portions of the universal joint, is greater than that of shaft portion 56. This is not necessary, however, according to the invention, but practically, the larger diameter provides additional hinge material for added strength over a longer period of use, and minimizes backlash in the thin hinged portions of the universal joint.

A short pinion gear shaft 78 is integrally molded as a portion of the outer driven shaft piece 66, coaxially therewith. The shaft piece 66 is tapered from the area of the universal joint toward the pinion gear shaft portion 78.

In the embodiment of the tuning shaft assembly 52 of FIG. 2, a conventional bushing mounting is provided except that the C-washer and flat washer 42, 40, respectively, are not required since the flange portion 58 is formed integrally with the shaft assembly. A spring washer 46 and C-washer 48, however, are required to mount the bushing to restrict rotation due to vibration and shock of the shaft assembly in a vehicle or the like environment.

An alternative arrangement for the vibration free mounting of the threaded bushing 34 on shaft portion 56 is shown in FIGS. 4a and 4b of the drawing. In the tuner shaft assembly 52a shown therein, the universal joint section is similar to that of shaft assembly 52 of FIGS. 2 and 3, however, the flange 58 against which the spring washer 46, used in mounting bushing 34, is pressed, has been changed. The flange 58 is thinner in construction, giving it greater resiliency and bendability.

The modified flange 58 is designed to co-operate with a modified threaded bushing 34a. The last-mentioned bushing has been formed to include a rear flange portion 38a which has a curved end surface 84 having a similar diameter as that of flange 58a. When the modified bushing is received on shaft portion 56 of the shaft assembly, the curved flange portion 38a is forced against the flange 58a to bend the latter as shown in FIG. 4b, against the curvature of flange 38a. To maintain the bushing in place against the tensioned flange 38a, a C-washer 86 is placed into a circumferential groove 88 formed at an appropriate location in shaft portion 56.

Once assembled, mounting the shaft assembly in a bezel or front plate of a radio receiver entails only the insertion of the shaft portion 56 and threaded bushing portion into an aperture in the bezel and thereafter the tightening down of a suitable nut fastener, such as 34, on the threaded bushing just as in the case of the prior art assembly or that of FIG. 2.

Still another alternative mounting arrangement is shown in FIGS. 5, 6a and 6b of the drawing. In the latter case, the tuning shaft assembly 52b is similar to the shaft assembly of FIG. 2 having a flange portion like that of the last-mentioned shaft assembly. The shaft portion 56b is, however, modified as shown in FIGS. 5, 6a and 6b to include an enlarged section 90 which is longitudinally cut to form a V-shaped cross-section (see FIG. 6a).

A conventional threaded bushing 34b of the type shown in FIGS. 1 and 2 is received on the shaft portion 56 as shown in FIGS. 5 and 6b. The end wall 94 of the flange of the bushing engages flange 58b as shown in FIG. 5.

Since the central bore of the threaded bushing 34b is smaller than the circumference of the enlarged portion 90 of the shaft portion 56, a friction fit is provided upon receipt of the shaft portion in the bushing. The enlarged portion 90, however, is compressed at the V-shaped cut 92 therein as shown in FIG. 6b to provide a rotationally restrictive mounting of the bushing on shaft portion 56b. The shaft portion 56b being of a plastic material is, however, permitted to turn within the bushing when the controlled pre-load force is exceeded.

As in the case of the other mounting arrangements, a C-washer 86 is received in a circumferential groove 88 in the shaft portion 56b to retain the bushing thereon.

As can be seen from the above description, the manual tuning shaft assembly according to the invention has fewer parts than the prior art manual tuning shaft assembly, lending itself to ease of assembly and installation in radio receivers or the like mechanisms. In addition, the tuning shaft assembly according to the invention is efficient in operation and relatively inexpensive to fabricate.

While particular embodiments of the invention have been shown and described, it should be understood that the invention is not limited thereto since many other modifications may be made. It is therefore contemplated to cover by the present application any and all such modifications as fall within the true spirit and scope of the appended claims.

I claim:

1. A one piece integrally formed plastic manual tuning shaft assembly mountable in an aperture in a mounting plate of a radio receiver or the like device, including in combination: a first rotatable driving shaft portion, a second rotatably driven shaft portion and a flange portion formed therebetween and having a cross-sectional dimension greater than the cross-sectional dimension of said first shaft portion, said first shaft portion adapted for receiving a bushing member thereon, the latter being receivable in the aperture in said mounting plate for mounting said assembly thereon, fastener means for retaining said bushing member on said first shaft portion with said bushing member being held against said flange portion, said second driven shaft portion including an integrally formed universal joint section comprising first and second opposing shaft pieces and a plate portion formed therebetween, a first integrally formed hinge joining said first shaft piece and said plate portion at a first surface thereof along a first line on said plate portion and a second integrally formed hinge joining said shaft piece and said plate portion at the opposite surface thereof along a second line extending substantially perpendicular with respect to said first line.

2. A one piece integrally formed plastic manual tuning shaft assembly as claimed in claim 1 wherein said flange portion is resilient and bendable and wherein the surface of said bushing member held against said flange portion is curved so that said flange portion is bent to conform to the curvature of said bushing for rotationally restrictive mounting of said shaft assembly in said bushing member.

3. A one piece integrally formed plastic manual tuning shaft assembly as claimed in claim 1 wherein said first shaft portion includes an enlarged shaft section, greater in dimension than the internal bore of said bushing member, for providing a friction fit of said bushing member on said shaft portion for rotationally restrictive mounting of said shaft assembly in said bushing member.

4. A one piece integrally formed plastic manual tuning shaft assembly as claimed in claim 3 wherein said enlarged portion includes a groove formed therein extending longitudinally of said shaft portion and wherein upon receipt of said bushing member on said shaft portion said enlarged portion is compressed to provide a frictional fit between said bushing member and said shaft portion, said shaft portion remaining rotatable within said bushing member.

5. A manual tuning shaft assembly mountable in an aperture in a mounting plate of a radio receiver or the like device, including in combination: an integrally formed plastic tuning shaft including a first driving shaft portion, a second driven shaft portion and a flange portion formed therebetween, said flange portion having a cross-sectional dimension greater than the cross-sectional dimension of said first shaft portion, a bushing having a central bore sufficiently large to receive said first driving shaft portion therein, said bushing being receivable in the aperture in said mounting plate for mounting said tuning shaft thereon, one wall of said bushing being engageable with said flange portion for maintaining the relative position of said bushing on said first driving shaft portion, said flange portion being resiliently bendable and said bushing wall being curved to bend said flange portion to conform to the curvature of said bushing wall, and means for retaining said bushing in engagement with said flange portion while in a bent position for rotationally restrictive mounting of said tuning shaft therein.

6. A manual tuning shaft assembly as claimed in claim 5 wherein said second shaft portion includes an integrally formed universal joint section comprising first and second opposing shaft pieces and a plate portion formed therebetween, a first integrally formed hinge joining said first shaft piece and said plate portion at a first surface thereof along a first line on said plate portion and a second integrally formed hinge joining said shaft piece and said plate portion at the opposite surface thereof along a second line extending substantially perpendicular with respect to said first line.

7. A manual tuning shaft assembly as claimed in claim 6 further including a pinion gear shaft formed integrally with and extending coaxially from the free end of one of said shaft pieces for rotation therewith.

* * * * *